(12) United States Patent
Ueda et al.

(10) Patent No.: US 6,276,224 B1
(45) Date of Patent: Aug. 21, 2001

(54) SHIFT CONTROL APPARATUS FOR TRANSMISSION

(75) Inventors: Yukio Ueda, Toyoake; Yoshiki Ito, Aichi-ken, both of (JP)

(73) Assignee: Aisin Ai Co., Ltd, Nishio (JP)

( * ) Notice: Subject to any disclaimer, the term of this patent is extended or adjusted under 35 U.S.C. 154(b) by 0 days.

(21) Appl. No.: 09/547,853

(22) Filed: Apr. 12, 2000

(30) Foreign Application Priority Data

May 25, 1999 (JP) ................................................ 11-145131

(51) Int. Cl.[7] .................................................. F16H 59/00
(52) U.S. Cl. ................................................................ 74/335
(58) Field of Search .................................................. 74/335

(56) References Cited

U.S. PATENT DOCUMENTS

| | | | |
|---|---|---|---|
| 4,616,521 | * 10/1986 | Akashi et al. | 74/335 |
| 4,944,194 | * 7/1990 | Tanoue et al. | 74/335 |
| 5,167,311 | * 12/1992 | Satoh et al. | 74/335 X |
| 5,224,392 | * 7/1993 | Hutchinson et al. | 74/335 |
| 5,697,251 | * 12/1997 | Lorriette et al. | 74/335 |
| 5,836,207 | * 11/1998 | Spooner et al. | 74/335 |
| 6,070,117 | * 5/2000 | Yamada et al. | 477/70 X |
| 6,131,476 | * 10/2000 | Miyazaki | 74/335 |
| 6,164,149 | * 12/2000 | Ohmori et al. | 74/335 X |

FOREIGN PATENT DOCUMENTS

97/05410  2/1997  (WO).

* cited by examiner

Primary Examiner—Sherry Estremsky
Assistant Examiner—Roger Pang
(74) Attorney, Agent, or Firm—Burns, Doane, Swecker & Mathis, LLP

(57) ABSTRACT

The present invention intends to provide a shift control apparatus for transmission which can reduce or prevent the speed-change shock and/or noise at the balk point where the sleeve engages with the ring in the shift push-in process.

In order to achieve the above object, a shift control apparatus for a transmission comprises a plural sets of paired free-rotate gears, a plural sleeves 17, 18, a plural sets of paired synchronize rings 27 to 29, an actuator 65, 70 for actuating the sleeve, a control means 50 for controlling the actuator based on a speed-change command. The control means 50 controls the actuator 70 so that the sleeve 18 is driven by a first drive force $Q_{max}$ upon starting of a speed-change operation, and is driven by a second drive force $Q_2$ smaller than the first drive force at least during a first time period $T_3'$ to $T_4'$ from a time before a balk point B of the sleeve where the sleeve engages with the synchronize ring in a shift push-in operation.

14 Claims, 4 Drawing Sheets

SHIFT CONTROL APPARATUS FOR TRANSMISSION

BACKGROUND OF THE INVENTION

1. Field of the Invention

The present invention relates to a shift Control Apparatus for a speed change apparatus (transmission), especially for a synchromesh type transmission.

2. Related Art

In a synchromesh-type transmission, as shown in FIG. 5, sleeves 17 and 18 which constitute a part of a cynchro mechanisms 15 and 16 are pressed to one of free-rotate gear groups of a 2nd-shift gear 11, a 3rd-shift gear 12 and a 4th-shift gear 13 (a 1st-shift gear and the like are not shown) mounted onto an output shaft 30 disposed coaxial with an input shaft 10, thereby rotating the free-rotate gear together with the output shaft 30. On a counter shaft 40 disposed parallel to the output shaft 30, gears 41, 42 and 43 are mounted to mesh with the above gears 11, 12 and 13 respectively.

The above synchromesh transmission is mainly comprised of clutch hubs 21 and 22, sleeves 17 and 18, second speed to fourth speed gear pieces 23 to 25, three synchronize rings 27 to 29. In detail, the clutch hubs 21 and 22 are spline-engaged with the input shaft 10 to be rotated together therewith, and the sleeves 17 and 18 are engaged with an outer peripheral surface of the clutch hubs 21 and 22 via splines 17a and 18a to be shifted axially but not to be rotated circumferantially relative thereto. Each of the second-speed gear piece 23, the third-speed gear piece 24 and the fourth-speed gear piece 25 is spline-engaged with a boss portion protruded from a side face of the free-rotate gear and having on an outer periphery thereof a dog teeth 23a, 24a and 25a. The synchronize rings (hereinafter, briefly called "ring") 27, 28 and 29 for second-speed, the third shft and the fourth shift are disposed respectively between a cone surface of the gear pieces 23, 24 or 25 and splines 17a and 18a on the inner peripheral surfaces of the sleeves 17 and 18.

Between the clutch hub 21 and the sleeve 17, and between the clutch hub 22 and the sleeve 18, shift keys (not shown) are respectively mounted by engaging with axial grooves formed by cutting some parts on the outer periphery of the clutch hubs 21 and 22 and nipped by inner peripheral surfaces of the sleeve 17 and 18. The shift gear has radial protrusions which engage with recesses formed on the inner peripheral surface of the sleeve 17 or 18 positioned at the neutral position, and disengage from the sleeve 17 and 18 positioned other than the neutral position.

Shift forks 31 and 32 engage with the sleeves 17 and 18, respectively. One of the shift forks 31 and 32 is engaged by a select member (not shown) selectively moved by a select operation of an operate (manual) lever in a select direction, then the selected sleeve 17 or 18 is moved (shifted) by a shift operation of the operate lever in a shift (Y) direction.

A speed-change process of the above synchromesh-type transmission will be explained with reference to FIG. 6 which shows a shift/select pattern of the operate lever, FIG. 7 which shows a stroke position of the sleeves 17 and 18, and FIG. 8 which shows an operate pressure of an actuator which actuates the sleeves.

In the synchromesh-type transmission, as shown in FIG. 5, the select member is engaged with the shift fork 31 in the 2nd-speed condition prior to the speed-change, and the sleeve 17 of the synchro mechanism 15 is shifted leftwardly. To the contrary, the sleeve 18 of the synchro mechanism 16 is positioned in the nuetral position. For speed-changing from a 2nd shift to a 3rd shift, as shown in FIG. 6, the operate lever is shifted from a 2nd shift position to a nuetral position N, then selected from a position corresponding to a 1st shift and 2nd shift to a position corresponding to a 3rd shift and a 4th shift, and then shifted from the neutral position N to a 3rd shift position.

When the operate lever is shifted from the 2nd shift position to the neutral position N at the time T1 in FIG. 7, an operate force directed rightwardly in FIG. 5 is applied to the sleeve 17 via the select member and shift fork 31, so that the sleeve 17 slides over the gear piece 23 of the 2nd-shift gear 11 without recieving resistance to reach the neutral position N at the time T2. This time period $(T_1-T_2)$ is called a "shift draw-out area").

After the shift draw-out of the sleeve 17, the operate lever is operated in the select direction so that the select member is disengaged from the shift lever 31 and is engaged with the shift lever 32 during a time period $(T_2-T_3)$ of FIG. 7. The shift fork 32, by a successive shift operation of the operate lever, starts to shift the sleeve 18 of the synchro mechanism 16 rightwardly in FIG. 5 at a time $T_3$. As a result, the shift key, by cooperating with the sleeve 18, presses an end surface of the ring 28. A time period $(T_3-T_4)$ when the shift key presses the end surface of the ring 28 is called a "shift push-in (index) area".

As apparent from FIG. 7, the sleeve 17 shifts by a constant speed in the shift draw-out area $(T_1-T_2)$, and the sleeve 18 shifts by a constant speed in the shift push-in area $(T_3-T_4)$ but is stopped in the select area $(T_2-T_3)$.

At a time $T_4$ when the shift key does not follow the shift of the sleeve 18, a chamfer of the spline 18a of the sleeve 18 starts to engage with outer teeth 28a of the ring 28. A stroke position of the sleeve 18 corresponding to the time $T_4$ is called a "synchronize start point (balk point)" where the sleeve 18 is stopped irrespective the force applied thereto. In the stroke position S of the balk point $T_4$, the sleeve 18 presses the ring 28 against the gear piece 24 and waits time $T_5$ when the gear piece 24 synchronizes with the sleeve 18 and the ring 28 of low-speed rotation. This time period $(T_4-T_5)$ is called a "synchronize area" where the sleeve 18 is stopped.

When the gear piece 24 synchronize with the sleeve 18 and the ring 28, a rotation friction torque between the ring 28 and the gear piece 24 is removed, so that sleeve 18 as the shifting thereof pushes apart the ring 28 and meshes with the dog teeth 24a of the gear piece 24. At this time, the rotate speed of the gear piece 24 and the 3rd-shift gear 12 is decreased to a value smaller than that upon the synchronization with the sleeve 18 due to drag torque thereof. For this reason, upon a re-synchronizing when the sleeve 18 meshes with the dog teeth 24a of the gear piece 24, the load applied from the gear piece 24 and the 3rd-shift gear 13 to the sleeve 18 varies suddenly. This stroke position of the sleeve 18 is called "two-shift input point".

The sleeve 18, after having pushed apart the gear piece 24 by overcoming the load at the two-shift input point, receives a stop force from an end surface of the 3rd-shift gear 12 to stop at a stroke position corresponding to a time T6. This time period $(T_5-T_6)$ is called "push-apart area" in which the sleeve 18 shifts in a constant speed. Thereafter, the sleeve 18 is maintained at the 3rd-shift position by a predetermined lock mechanism which engages with the shift fork 32 and the operate lever.

The shifting of the sleeves 17 and 18 of the synchro-mechanisms 15 and 16 based on the shift operation of the shift lever is automatically operated by a hydraulic or electric actuator controlled by a controller. One of the transmission which includes such automatic operation is shown in WO97/05410, for example. In this prior art, as shown in FIG. 8, a control means including the controller, adjusts an operate pressure of the actuator based on a vehicle condition or a speed-change process.

In detail, the control means sets an operate pressure in a max. value $P_{max}$ in the shift draw-out area $(T_1-T_2)$ of the sleeve 17 and the shift push-in area $(T_3-T_4)$ of the sleeve 18 to shift the sleeves 17 and 18 by a large drive force and in a high speed. On the other hand, at the balk point where the synchronization of the sleeve 18 with the ring 28 etc. are started, the operate pressure of the actuator is decreased to an adjusted value $P_1$ needed for the synchronizing to thereby press the sleeve 18 against the ring 28 by a weaker force. Such weaker press force is convenient to extend an endurance character of construction members of the transmission and to reduce or prevent a noise or a speed change shock occurred upon the synchronizing. In a push-apart area $(T_5-T_6)$ after a time $T_5$ when the synchronization has been completed and a predetermined time period after having detected a stop point, the operate pressure for the actuator is set in the max. value $P_{max}$ again to shift the sleeve 18 by the large force and in the high speed. In a time period before the speed-change operation and a time period after the stop point, the operate pressure of the actuator is set in zero.

However, in the conventional control manner by the control means for the actuator, the operate pressure of the actuator is maintained in the max. value during the shift draw-out area $(T_1-T_2)$ of the sleeve 17, select area and the shift push-in area $(T_3-T_4)$ of the sleeve 18, and maintained in the max. value at the balk point B where the sleeve 18 starts to synchronize with the ring 28. Therefore, the sleeve 18 abuts against the ring 28 by the large drive force and in the high speed to thereby generate the speed-change shock and the noise. If the operate pressure of the actuator upon the shifting push-in of the sleeve 18 is decreased, there is fear that the shift push-in of the sleeve 18 may become inaccurate or longer time is required for the shift push-in of the sleeve 18. On the other hand, the operate pressure of the actuator is adjusted (decreased) to the adjusted value $P_1$ to thereby decrease the drive force of the sleeve 18 correspondingly. However, the speed-change shock or noise may be generated even in this adjusted value $P_1$ depending on the rotate speed of the gear piece 24 and the like.

In addition to the speed change from the 2nd shift to the 3rd shift via the select operation, in a speed change from the 4th shift to the 5th shift via a select operation and a shift-down operation via the select operation, the speed-change shock or the noise may occur. Same problem may occur in a speed change (shift-up and shift-down) without the select operation. That is, the shock/noise may occur in all kinds of the shift operation.

SUMMARY OF THE INVENTION

In view of the above circumstances, the present invention intends to provide a shift control apparatus for transmission which can reduce or prevent the speed-change shock and/or noise at the balk point where the sleeve engages with the ring in the shift push-in process, and in the two-shift input point where the sleeve pushes apart the ring and engages with the gear piece.

In order to achieve the above object, a shift control apparatus for a transmission comprises 1) a plural sets of paired free-rotate gears mounted on a rotary shaft corresponding to speed-change gears, 2) a plural sleeves each mounted on the rotary shaft not to be rotated circumferentially and to be shifted axialy thereof, 3) a plural sets of paired synchronize rings disposed between each set of said free-rotate gears and each of said sleeve, 4) an actuator for moving each of said sleeves, 5) a control means for controlling said actuator based on a speed-change command, said control means controlling said actuator so that each of said sleeve is driven by a first drive force upon starting of a speed-change operation, and is driven by a second drive force smaller than the first drive force, at least during a first time period from a time before a balk point of said sleeve where said sleeve engages with said synchronize ring in a shift push-in operation. Thus, a speed-change shift is changed by engaging said sleeve driven by said actuator with one of said synchronize rings and said free-rotate gears.

According to the shift control apparatus for transmission, the drive force of the sleeve is decreased at least at the timing just before the balk point where the sleeve engages with the ring in the shift push-in area, so the speed change shock and noise at the balk point can be reduced. Also, as the occasion demands, the drive force of the sleeve can be decreased at the timing just before the two-shift input point where the sleeve pushes apart the ring and engages with the gear piece.

The present invention can have following embodying modes.

Three sets of synchro mechanisms can be provided when the transmission includes five forward shifts and one backward shift, while two sets of synchro mechanisms can be provided when the transmission includes three forward shifts and one backward shift. The numbers of the sleeves correspond to the numbers of sets of the free-rotate gears, so three sleeves or two sleeves are provided for three sets or two sets of the free-rotate gears. As the actuator(s), one actuator for the shift operation and one actuator for the select operation can be provided, or an actuator for the shift operation and an actuator for the select operation can be made integral. In the transmission including five forwards shifts and one backward shift for example, the shift control of the present invention can be applied to the speed-change between the 2nd shift and the 3rd shift or between the 4th shift and the 5th shift via the select operation, and to the speed-change between the 1st shift and the 2nd shift or between the 3rd shift and the 4th shift without the select operation.

A target speed-change shift can be set by an operate lever handled by a driver, a lever switch contacts of which are opened/closed, or a button-type switch.

The actuator can be an electric type and hydraulic type. The electric-type actuator can be comprised of for example an electric motor, a pinioin attached to an output shaft of the motor and an a rack meshed with the pinion and connected to the shift fork. On the other hand, the hydraulic-type actuator can be comprised of for example a master valve, proportional flow-amount valve communicated with the master valve, and an oil cylinder or an air cylinder communicated with the master cylinder and the proportional flow-amount valve and connected with the sleeve. A rod of the oil cylinder or air cylinder is connected with the shift fork.

An operate force of the hydraulic-type actuator is controlled in a first operate pressure at the start or beginning of speed-change, and in a second operate pressure smaller than the first operate pressure just before the balk point. The operate force of the actuator can be increased from the second operate pressure to a third operate pressure larger than the second operate pressure just before the two-shift input point. The hydraulic cylinder of the actuator, in the transmission including the fire forward shifts and one backward shift for example, shifts draw-out one sleeve from the 2nd shift position or the 4th shift position by the movement from a retract position to an advance position, and shifts push-in the same or other sleeve to a 1st shift position, a 3rd shift position or a 5th shift position by a movement from the neutral position to the advance position in the speed-change in minus (−) direction in FIG. 6.

The sleeve is driven by the actuator, and the drive force thereof is adjusted to a third drive force smaller than a first drive force but is larger than a second drive force during a second time period before the two-shift input point. Also, the sleeve moves in a first speed at the beginning of the speed-change, moves in a second speed smaller than the first speed when the drive force is decreased to the second drive force, and moves in a third speed larger than the second speed when the drive force is increased to the third drive force. In the hydraulic-type actuator, the drive force of the sleeve is determined in connection with an oil source and a master valve of the actuator, and the move speed of the sleeve is determined in connection with the oil source, the master valve and a proportional flow-amount valve.

A first predetermined time period for applying the second drive force can continue until the balk point of the sleeve is detected, while a second predetermined time period for applying the third drive force can continue until the sleeve moves beyond the stop point where the sleeve abuts onto an end surface of the free-rotate gear.

The electric control means can be comprised of an extra electric circuit which controls an amplify degree of current flown to an actuator, and a computer-type controller such as a ECU or an extro electric circuit generating a current shape and controls the actuator. On the other hand, the hydraulic actuator can be comprised of a hydraulic control circuit, and a computor-type controller such as a ECU or an extra electric circuit to control electro-magnetic valve disposed in the hydraulic control circuit.

The control means can, for example, controls the controller of the electric actuator the electro-magnetic valve so that the operate pressure of the actuator i.e. the drive force of the sleeve is set in the max. value at the beginning of the speed-change, decreased to the min. value before the balk point where the sleeve meshes with the synchronize ring, increased to a first value during the synchronize area after the synchronize area, returned to the max. value at the beginning of the push-apart operation, and decreased to a second value higher than the first value before the two-shift input point where the sleeve meshes with the free-rotate gear.

Here, the control means can decrease the operate pressure of the shift cylinder i.e. the drive force and the move speed of the sleeve by controlling the current flown to the electromagnetic valve of the actuator, or can decrease only the move speed of the sleeve without changing the operate pressure of the shift cylinder i.e. the drive force of the sleeve. The shock and the noise felt by the passenger is generated by vibration of a vehicle, and quality thereof is mainly determined by an amplitude and a frequency thereof. Decrease of the drive force of the sleeve contributes to decrease the amplitude, while decrease of the move speed of the sleeve contributes to decrease the frequency. In any way, there are band areas of the shock and the noise felt by the passenger, so the present invention intends to shift or offset such band areas.

PREFERRED EMBODIMENT OF THE INVENTION

Hereinafter, a preferred embodiment of the present invention will be explained with reference to attached FIGS. 1 to 4. However, it is noted that this embodiment should not be interpreted to limit the present invention.

Figure 5:
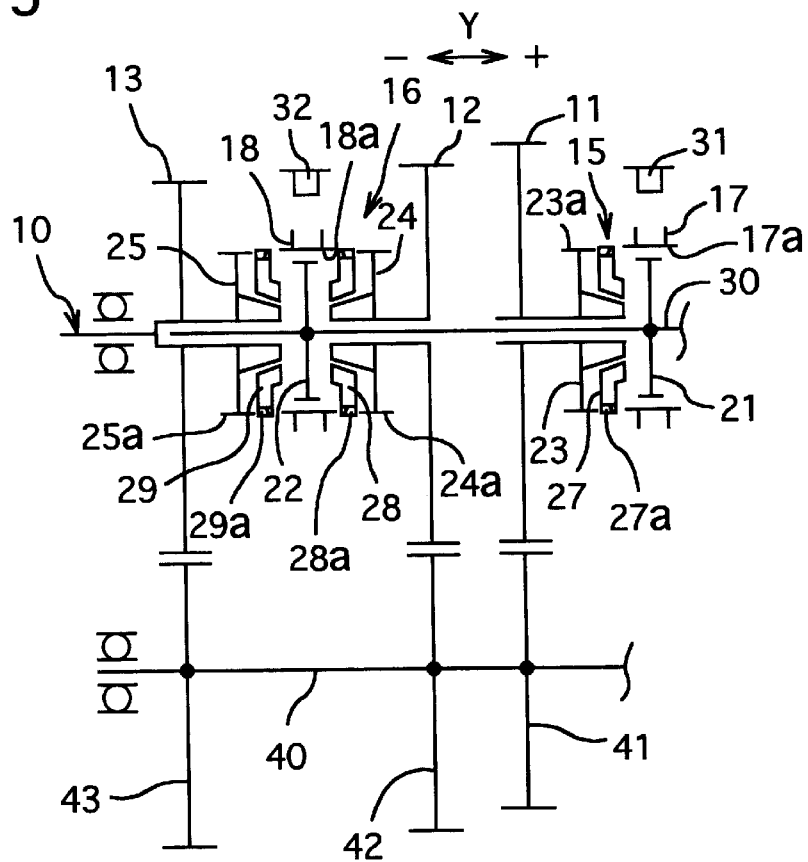
FIG. 5 is a skelton view showing a popular construction of synchromesh-type transmission.

A shift control apparatus of this embodiment is comprised of an operate lever 60 and a switch 59; a control means 50 including a master valve 51, a pair of proportional flow-amount valves 52 and 53 and a controller 58; and an actuator including an oil pump 55 driven by an electric motor (not shown), an accumulator 56, a select cylinder 65 and a shift cylinder 70 etc., and drives the shifting of the sleeves 17 of the synchro mechanism 15 and the sleeves 18 of the synchro mechanism 16 shown in FIG. 5.

The master valve 51 is a solenoid-type pressure control valve which outputs a pressure proportional to a solenoid current applied, and having a solenoid 51a, a left position 51b, a right position 51c and a neutral position (not shown). The master valve 51 is switched to the left position 51b and the right position 51c depending on a current applied to the solenoid 51a by an activation of the solenoid 51a to output a presssure proportional to the value of current, and is switched to the neutral position by an inactivation (off-condition) of the solenoid 51a to thereby interrupt the supplying of the oil.

Each of the proportional flow-amount valves 52 and 53 has a solenoid 52a or 53a, a left position 52b or 53b, and a right position 52c or 53c, and is switched to the left position 52b, 53b and the right position 52c, 53c to vary the supply location and the flow amount of the pressure oil flowing therethrough in proportional to amount of current applied to the solenoid 52a or 53a in the condition of the master valve 51 in which the current is flown in the master valve 51 and the pressure oil is supplied (on-condition). The master valve 51 and the proportional flow-amount 0 valves 52, 53 are communicated by passages 55a and 55b.

The controller 58 is comprised of a ECU and the like, and recognizes a target or aimed speed-change shift by a signal inputted from a switch 59 switched by an operate (manual) lever provided near a driver's seat. The controller 58 controls a current amount supplied to the electric motor of the pump 55, and the solenoids 51a, 52a and 53a of the master valve 51 and the proportional flow-amount valves 52 and 53, thereby controlling a driving of a select cylinder 65 and a shift cylinder 70 corresponding to the speed-change shift.

The controller 58 activates the solenoid 51a of the master cylinder 51 based on the speed-change signal to switch the left position 51b and the right position 51c depending on the current applied to the solenoid 51a to thereby vary the pressure value. Thus, the pressure oil is supplied from the accululator 56 to the proportional flow-amount values 52 and 53 through the passages 55a and 55b. On the other hand, the controller 58 inactivates the solenoid 51a of the master valve 51 based on the speed-change signal to switch the master valve 51 to the neutral position. In this condition, the supplying of the pressure oil is interrupted by the master valve 51, and the pressure oil is not supplied to a right (front) pressure chamber 66b of the select cylinder 65 and a lower (front) pressure chamber 71b of the shift cylinder 70. A left (rear) pressure chamber 66a of the select cylinder 65 and an upper (rear) pressure chamber 71a of the shift cylinder 70 are communicated with the left positions 52b, 53b or the right positions 52c, 53c of the proportional flow-amount valves 52, 53 depending on the current value of the solenoids 52a, 53a. When the pressure chambers 66a, 71a are communicated with the left positions 52b, 53b no pressure oil is supplied thereto, while they are communicated with the right positions 52c, 53c, the reserve pressure is applied thereto. In both cases, the select cylinder 65 and the shift cylinder 70 are not shifted.

The select cylinder 65 is provided for driving the select member engaged with one of the shift forks 31 and 32 in the select direction, and includes a cylinder 66 and a piston 67. A left pressure chamber 66a of the select cylinder 65 is communicated with the proportional flow-amount valve 52 via a passage 55c and a right pressure chamber 66b thereof is communicated with the master valve 51 via a passage 55d. In the activated condition of the master valve 51, the pressure oil is always supplied to the right pressure chamber 66b via the passage 55d. So, when the pressure oil is applied from the proportional flow-amount valve 52 to the left pressure chamber 66a through a passage 55c, the piston 67 moves forwardly (in plus (+) X direction) by difference of pressure receive area, and when the reserve pressure is applied from the proportional flow-amount valve 52 the piston 67 moves rearwardly (in minus (-) X direction). The piston 67 cause the select member to engage with the shift fork 32 when it is located in a rearmost position (the rod 67 is retracted to the max. extent), to engage with the shift fork 31 when it is located in the neutral position, and to engage with a shift fork (not shown) for a 5th-shift and rearward shift when it is located in the frontmost position.

The shift cylinder 70 is provided for shifting the select member in the shift direction and shifting the shift fork 31 or 32 engaged with the select member in the shift direction, and includes a cylinder 71 and a piston 72. An upper pressure chamber 71a of the shift cylinder 70 is communicated with the proportional flow-amount valve 53 via a passage 55e and a lower pressure chamber 71b thereof is communicated with the master valve 51 via a passage 55d. In the activated condition of the master valve 51, the pressure oil is always supplied to the lower pressure chamber 71b of the shift cylinder 70 via the passage 55d. So, when the pressure oil is applied from the proportional flow-amount valve 53 to the upper pressure chamber 71a through a passage 55e, the piston 72 moves forwardly (in plus(+) X direction) by difference of pressure receive area, and when the reserve pressure oil is applied from the proportional flow-amount valve 53 the piston 72 moves rearwardly (in minus (-) X direction). The piston 72 shifts the shift forks 31, 32 in the -Y direction when it is located in a rearmost position (the rod 72 is retracted to the max. extent), and moves the shift fork 31, 32 in the +Y direction when it is located in the frontmost position.

An advance position and a retract position of the piston rods 67a and 72a of the select cylinder 65 and the shift cylinder 70 are detected by position sensors 68 and 73 respectively which in turn output detected positions to the controller 58.

When the speed-change shift of the cynchromesh-type transmission shown in FIG. 5 is shifted, the master valve 51, the proportional flow-amount valves 52 and 53 are controlled by the actuator 58 in the flowing manner. Here, a shift-up operation from the 2nd shift to the 3rd shift performed by shifting the sleeves 17 and 18 of the synchro mechanisms 15 and 16 by the select cylinder 65, the shift cylinder 70, the select member, and the shift forks 31 and 32 will be explained.

Figure 1:
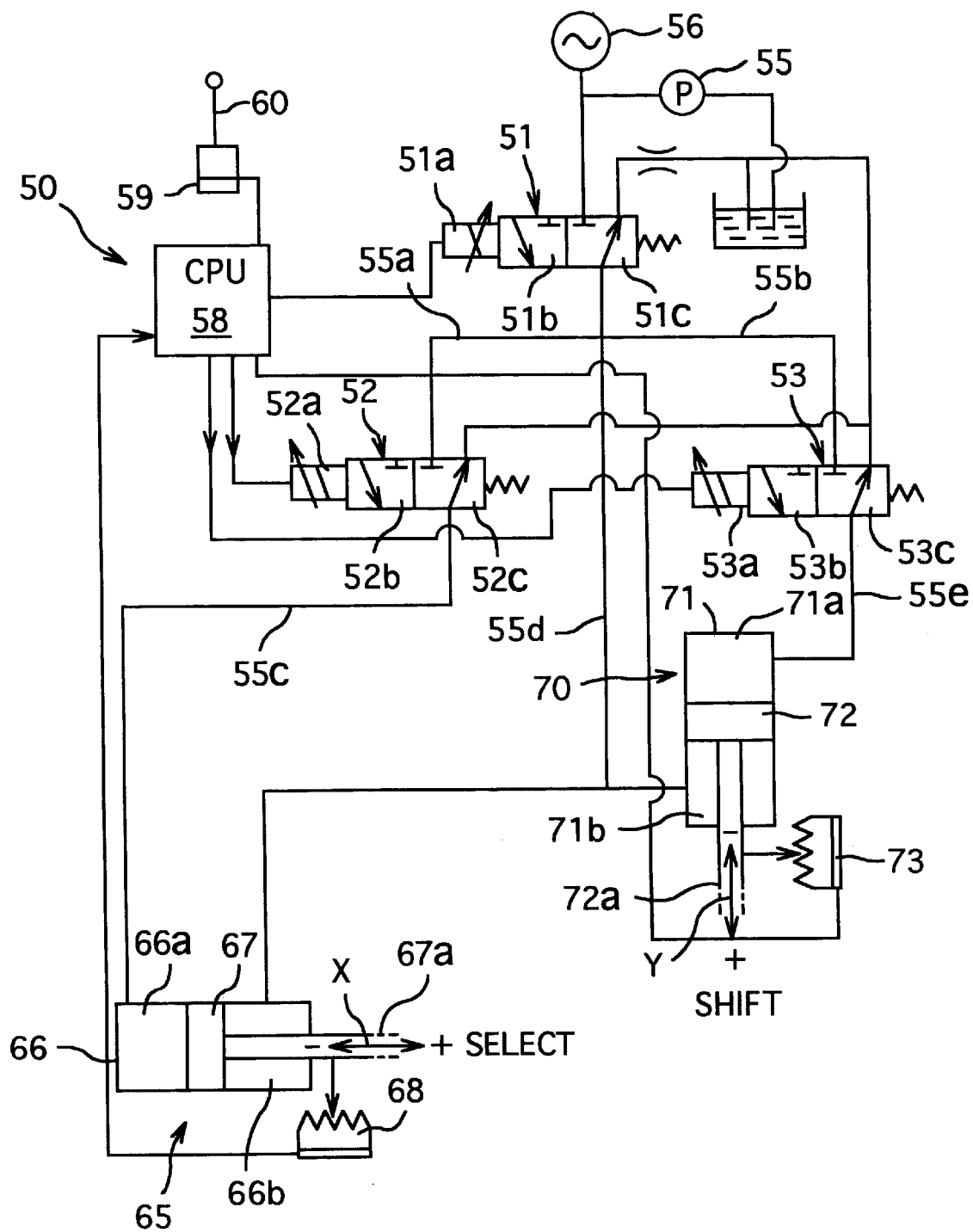
FIG. 1 is a constructive view of one embodiment of the present invention.

In the 2nd-shift condition, no current is supplied from the controller 58 to the solenoid 51a, and the master valve 51 is brought to the neutral position. So, as shown in FIG. 1, the piston rods 67a and 72a of the select cylinder 65 and the shift cylinder 70 are brought to a free condition. The shift fork 31 of FIG. 5 is held by the lock mechanism and causes the sleeve 17 of the synchro mechanism 15 to engage with the gear piece 23.

Figure 6:
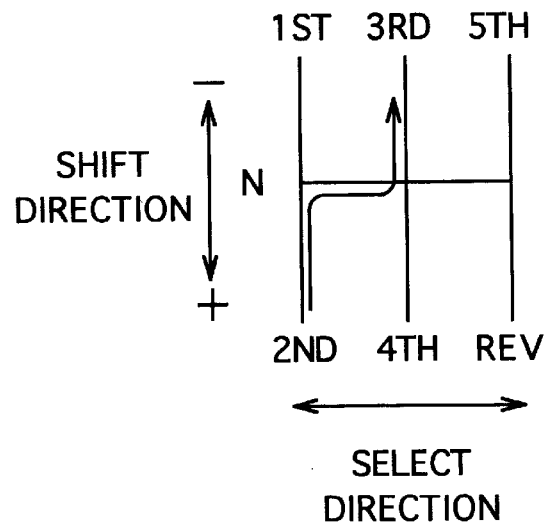
FIG. 6 is an explanatory view showing a popular operate pattern of an operate lever.
Figure 7:
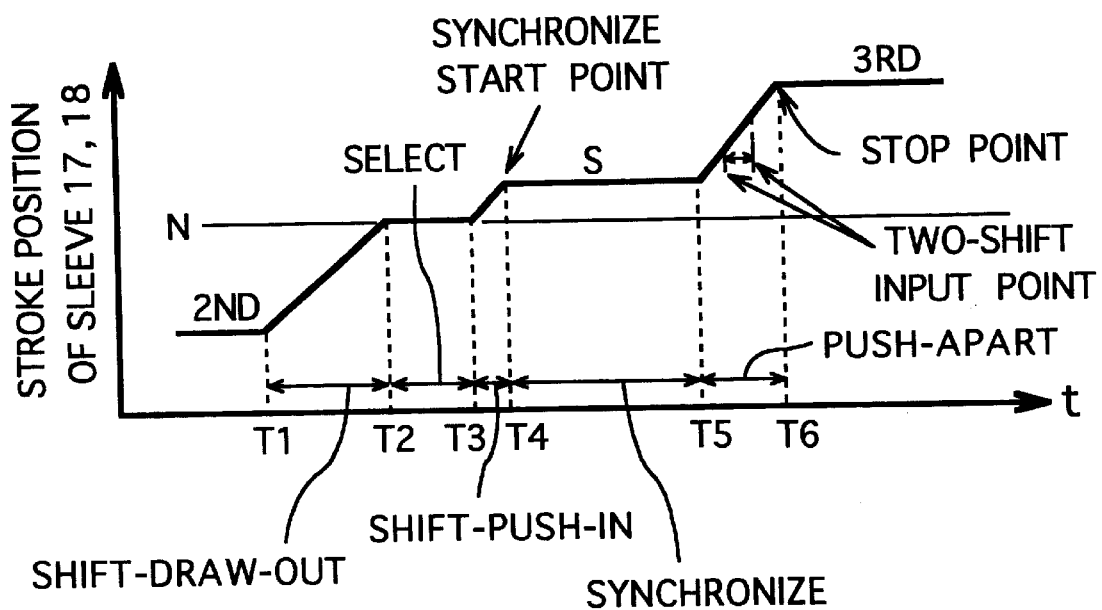
FIG. 7 is an operate view showing a stroke position of the sleeve of a conventinal art.
Figure 8:
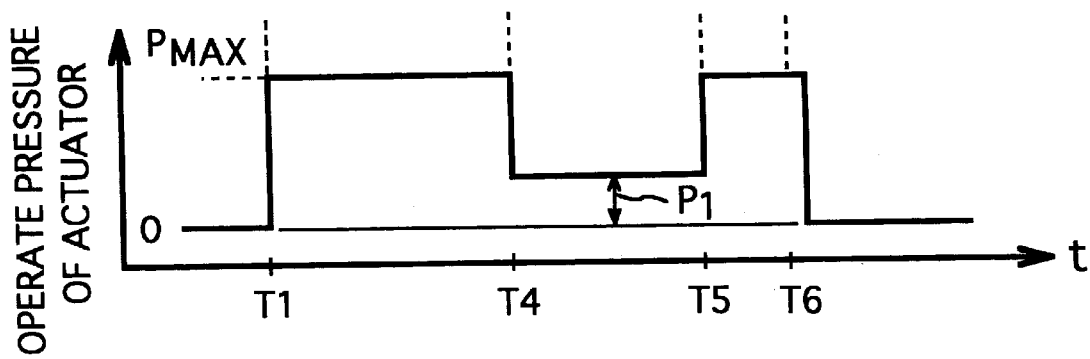
FIG. 8 is an operate view showing an operate pressure of an actuator of a conventinal art.

From this 2nd-shift condition, the operate lever 60 is operated along the shift pattern of FIG. 6. Based on operation o the operate lever 60, the controller 58 controls the master valve 51 and the proportional flow-amount valves 52 and 53 so that the shift cylinder 70 shifts the shift fork engaged by the sleeve 17, the select cylinder 65 selects (moves) the select member for causing it to engage with the shift fork 32, and the shift cylinder 70 shifts the shift fork 32. Concretely, this speed-change process is set by setting a basic wave shape of the current supplied from the controller 58 to the solenoids 52a and 53a of the proportion flow-amount valves 52 and 53, or by setting a wave pattern to switch a amplify rate of the current. The basic wave shape and the basic pattern of the current supplied to the solenoids 52a and 53a are varied timings of the wave-shape variation and the amplify-rate variation according to the position signals from the position sensors 68 and 73.

Next, each step for the speed change will be explained.
<Step 1 (Shift Draw-out)>

Figure 2:
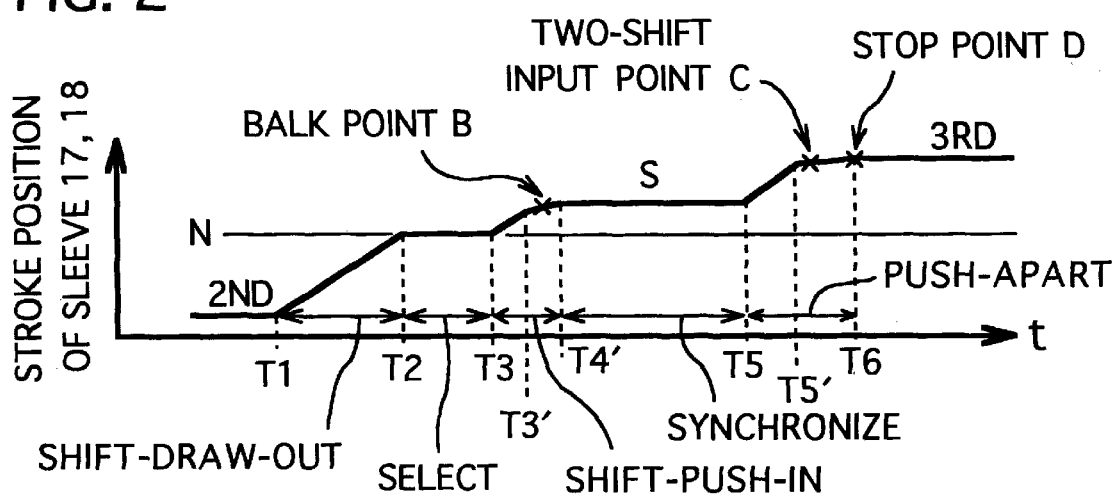
FIG. 2 is an operate view showing a stroke position of a sleeve of the above embodiment.
Figure 3:
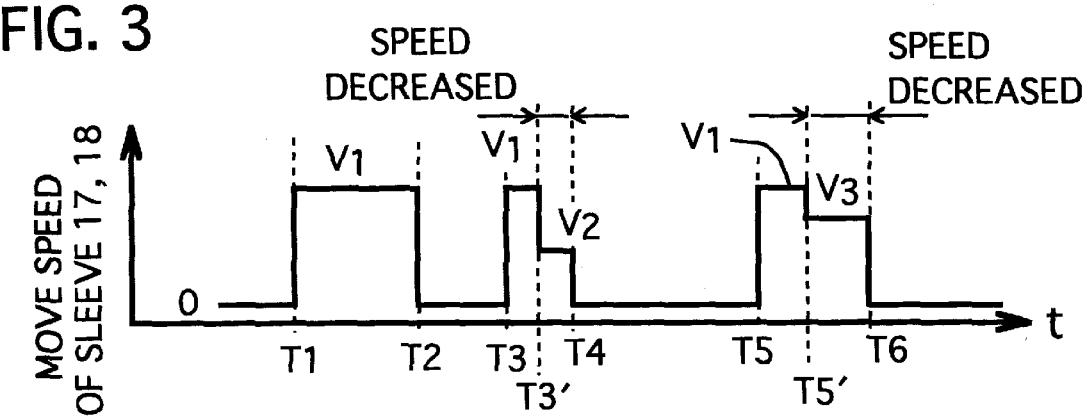
FIG. 3 is an operate view showing a moving speed of sleeve of the above embodiment.
Figure 4:
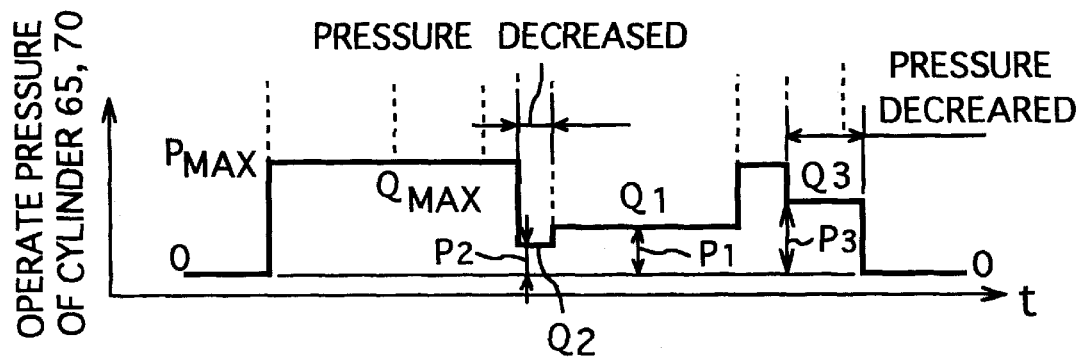
FIG. 4 is an operate view showing an operate pressure of a select cylinder and a shift cylinder of the above embodiment.

Based on the shift operation of the operate lever 60 by the driver from the 2nd-shift position to the neutral position N at a time $T_1$ in FIG. 1, the controller 58 supplies the current to the solenoids 51a and 53a of the master valve 51 and proportional flow amount valve 53 to supply the pressure oil of the max. amount from beginning of speed-change, but increases/decreases the current supplied to the solenoid 52a of the proportional flow-amount valve 52. As a result of the current increase/decrease the solenoid 52a, the proportional flow-amount valve 52 is switched to the left position 52b and the right position 52c repeatedly to supply the pressure oil to the left and right pressure chambers 66a and 66b of the select cylinder 65. When the proportional flow-amount valve 52 is switched to the left position 52b the piston 67 of the select cylinder 65 moves in the +X direction due to a difference of pressure receive areas between area of the left pressure chamber 66a to which the pressure oil of the master cylinder 51 is applied and area of the right pressure chamber 66b; while when it is switched to the right position 52c the piston 67 moves in the -X direction due to different of a pressure difference between pressure of the left pressure chamber 66a to which the pressure oil of the master cylinder 51 is applied and pressure of the right pressure chamber 66b. Thus, in both cases, the piston 67 of the select cylinder 65 is moved to the neutral position to hold the select member engaging with the shift fork 31 in the condition in which the solenoid 52a reveals a current value located between the current values of the left position 52b and the right position 52c. Hereinafter, this condition of this proportional flow-amount-valve 52 is called "hold", which is same for the proportional flow-amount valve 53. As a result of the max. amount of the pressure oil by the master valve 51 and the proportional flow-amount valve 53, the pressure oil is supplied via the passage 55e to the upper pressure chamber 71a as shown in FIG. 4, so that the operate pressure of the shift cylinder 70 is set in the max. value $P_{max}$. Accordingly, the piston 72 moves in the +Y direction to advance the shift fork 31 engaged with the select member, and the shift fork 31 of FIG. 5 in turn moves the sleeve 17 of the synchro mechanism 15 by the drive force $Q_{max}$ as shown in FIG. 4, and by the speed $V_1$ as shown in FIG. 3. Thus, the sleeve 17 is subjected to the shift draw-out operation (refer to the time period ($T_1$–$T_2$) in FIG. 2), and shifted to the neutral position N.

<Step 2 (Select Operation)>

When the position signal of the position sensor 73 outputs the neutral position N of the piston 72 of the shift cylinder 70, the controller 58 based on it sets the proportional flow-amount valve 52 in a current decrease condition (right position 52c), and the proportional flow-amount valve 53 in a current increase/decrease condition or a hold condition. As a result of the current decrease of the proportional flow-amount valve 52, the piston 67 of the select cylinder 65 moves in the –X direction for causing the select member to engage with the shift fork 32 in FIG. 5. On the other hand, as a result of the current increase/decrease or the hold of the proportional flow-amount valve 53, the pressure oil is supplied to the upper pressure chamber 71a and the lower pressure chamber 71b of the shift cylinder 70. Thus, the piston 72 is held in the neutral position, and has the speed of zero as shown in FIG. 3. In this way, a select operation ($T_2$–$T_3$) of FIG. 2 is performed.

<Step 3 (Shift Push-in)>

When the piston 67 of the select cylinder 65 retracts to the rearmost (leftmost in FIG. 1) position, the controller 58 based on it recognizes the completion of the select operation, that is, the time $T_3$ for the shift push-in of the sleeve 18 by the position signal of the position sensor 68. In the shift push-in process, the controller 58 holds the current increase condition (left position 53b) of the master valve 51 and the proportional flow-amount valve 53. Thus, the pressure oil is supplied via the passage 55e to the upper pressure chamber 71a of the shift cylinder 70 to advance the piston 72 in the +Y direction so that the sleeve 18 in FIG. 5 is pushed against the ring 28.

In this embodiment, at a time $T_3'$ before a time $T_4$ (refer to FIG. 6) when a balk point B(a point when the sleeve 18 abuts onto the outer teeth 28a of the ring 28 in course of the advance of the piston rod 72a of the shift cylinder 70 in the +Y direction) is detected by the position sensor 73 by a predetermined distance, the controller 58 decreases the current supplied to the solenoid 51a of the master valve 51. The distance or the time period between the time $T_3'$ and the balk point is set, for example, based on experience or actual result obtained from the design value, variation of the input shaft and the output shaft, in view of the response time of the master valve 51 and the proportional flow-amount valve 52, 53. Thus, the pressure value of the pressure oil supplied from the proportional flow-amount valve 53 to the upper pressure chamber 71a of the shift cylinder 70 is decreased, so that the operate pressure of the shift cylinder 70 is set in an operate pressure $P_2$ which is smaller than $P_{max}$ ($P_2 < P_{max}$) between the time $T_3'$ and the time $T_4'$ including the balk point B.

As a result, the drive force for the shift fork 32 and the sleeve 18 in the time period ($T_3'$–$T_4'$) is set in a drive force $Q_2$ which is smaller than the drive force $Q_{max}$. As shown in FIG. 3, the sleeve 18 has a speed $V_2$ which is smaller than the speed $V_1$. The distance or the time period between the time $T_3'$ the balk point is set, for example, based on experience or actual result obtained from the design value, variation of the input shaft and the output shaft, in view of the response time of the master valve 51, and the proportional flow-amount valve 52, 53. In this way, the chamfer of the sleeve 18 can be engaged with the outer teeth 28a of the ring 28 softly. Here, the time $T_4'$ is a timing after a predetermined time lapse when the position sensor 73 detects the stroke position S of the balk point B. Also, in a time period ($T_3$–$T_3'$) the operate pressure of the shift cylinder 70 is set in the pressure $P_2$, and the drive force of the sleeve 13 is set in the speed $Q_2$.

<Step 4 (Synchronize)>

When the balk point B is detected by the position sensor 73, the controller 58 based on it supplies more current to the solenoid 51a of the master valve 51 so that the operate pressure of the shift cylinder 70 is decreased to a pressure $P_1$, and the drive force for the sleeve 18 is decreased to a force $Q_1$. In this synchronize period ($T_4'$–$T_5$), the sleeve 18 maintains the pushed state onto the end surface of the ring 28 by the drive force $Q_1$ and is stopped (refer to FIG. 3), and waits a time when the rotate speed of the 3rd-shift gear 12 comes close to that of the sleeve 18.

<Step 5 (First-half of Push-apart)>

When the rotate speed between the sleeve 18 and the 3rd-shift gear 12 is synchronized, the sleeve 18 can advances to the 3rd-shift position since the ring 28 becomes to idly rotate. By the position signal of the position sensor 73 corresponding to the advance position of the sleeve 18, the controller 58 supplies the most current to the solenoid 51a of the master cylinder 51. As a result, the operate pressure of the shift cylinder 70 in the time period ($T_5$–$T_5'$) is set in the pressure $P_{max}$, and accordingly the drive force for the sleeve 18 is set in the force $Q_{max}$ same as that in the shift draw-out process. Here, the sleeve 18 advances by a speed $V_1$ as shown in FIG. 3.

<Step 6 (Second-half of Push-apart)>

When a position of the sleeve 18 in FIG. 5 before a position where the sleeve 18 pushed by the drive force $Q_{max}$ engages with the teeth 24a of the gear piece 24 by a predetermined distance is detected by the position sensor 73, the controller 58 based on it at a time $T_5'$ decreases the current supplied to the solenoid 51a of the master cylinder 51 again, until a time $T_6$. This is for preventing the speed-change shock and noise at a two-shift input point C where the sleeve 18 engages with the gear piece 24, and a stop point D where the sleeve 18 abuts onto the 3rd-shift gear 12. The distance or the time period between the time $T_3'$ and the balk point is set, for example, based on experience or actual result obtained from the design value, variation of the input shaft and the output shaft, in view of the response time of the master valve 51 and the proportional flow-amount valve 52, 53. A decrease amount of the current to the master valve 51 is select to be smaller than that at the above time $T_3'$, and therefore the value of the current at this time $T_5'$ is larger than that of the above time $T_3'$.

Accordingly, the operate pressure $P_3$ for the shift cylinder 70 in the time period ($T_5'$–$T_6$) including the two-shift input point C and the stop point D is selected to be larger than the operate pressure $P_2$ in the time period ($T_3'$–$T_4'$) including the balk point B. Corresponding to it, the drive force $Q_3$ for the sleeve 18 in the time period ($T_5'$–$T_6$) is selected larger than the drive force $Q_2$ in the time period ($T_3'$–$T_4'$), and the move speed $V_3$ of the sleeve 18 in the time period ($T_5'$–$T_6$) is selected faster than the move speed $V_2$ in the time period $(T_3'-T_4')$ as shown in FIG. 3. These differences of the pressure and the force are provided because the speed-change shock and the noise occurred in the two-shift input point C is smaller than that occurred at the balk point B.

When the stop point D of the sleeve 18 in FIG. 4 is detected by the position sensor 73, the controller 58 based on it stops the supplying of the current to the master valve 51 and the proportional flow-amount valve 53, to thereby complete the speed-change process.

A Table 1 summarizes the operation of the master valve 51, the proportional flow-amount valves 52 and 53, the select cylinder 65 and the shift cylinder 70 in each of the steps S1 to S6.

TABLE 1

| Step | 51 | 52 | 53 | 65 | 70 |
|------|----|----|----|----|----|
| 1 | ON | increase/decrease or hold | increase (max.) | N | up → N |
| 2 | ON | decrease | increase/decrease or hold | N → left | N |
| 3 | ON (decreased at $T_3'$) | hold | increase | left | N → down |
| 4 | ON (increased at $T_4'$) | hold | increase | left | N → down |
| 5 | ON (max.) | hold | increase | left | N → down |
| 6 | ON (decreased at $T_5'$) | hold | increase | left | N → down |

What is claimed is:

1. A shift control apparatus for a transmission, comprising:
   a plural sets of paired free-rotate gears mounted on a rotary shaft corresponding to speed-change gears;
   a plural sleeves each mounted on the rotary shaft not to be rotated circumferentially and to be shifted axialy thereof;
   a plural sets of paired synchronize rings disposed between each set of said free-rotate gears and each of said sleeve;
   an actuator for moving each of said sleeves; and
   a control means for controlling said actuator based on a speed-change command, said control means controlling said actuator so that said sleeve is driven by a first drive force upon starting of a speed-change operation, and is driven by a second drive force smaller than the first drive force at least during a first time period from a time before a balk point of said sleeve where said sleeve engages with said synchronize ring in a shift push-in operation,
   whereby a speed-change shift is changed by engaging said sleeve driven by said actuator with one of said synchronize rings and said free-rotate gears.

2. A shift control apparatus according to claim 1, wherein said control means further controlling said actuator so that said sleeve is driven by a third drive force smaller than the first drive force during a second time period from a time before a two-shift input point of said sleeve where said sleeve engages with said free-rotate gear.

3. A shift control apparatus according to claim 2, wherein the third drive force is larger than the second drive force.

4. A shift control apparatus according to claim 1, wherein said actuator is of hydraulic type and decrease the first drive force of said sleeve to second drive force by being decreased an operate pressure thereof by said control means from a first operate pressure to a second operate pressure.

5. A shift control apparatus according to claim 2, wherein said actuator increases the second drive force of said sleeve to third drive force by being increased an operate pressure thereof by said control means from a second operate pressure to a third operate pressure.

6. A shift control apparatus according to claim 4, wherein said actuator includes a master cylinder, a proportional flow-amount cylinder communicated with the master cylinder, and a hydraulic cylinder communicated with the master cylinder and the proportional flow-amount cylinder and connected to said sleeve, all of which are controlled by said control means.

7. A shift control apparatus according to claim 6, wherein the hydraulic cylinder of said actuator performs a shift draw-out of one of said sleeve by movement from a retract position to a neutral position, and performs a shift push-in of other of said sleeve by movement from the neutral position to a advance position.

8. A shift control apparatus according to claim 1, wherein said control means continues the first time period of the second drive force until the balk point of said sleeve is detected.

9. A shift control apparatus according to claim 2, wherein said control means continues the second time period of the third drive force until said sleeve moves beyond a stop point where said sleeve abuts onto an end surface of the free-rotate gear.

10. A shift control apparatus according to claim 1, wherein said control means controls said actuator so that said sleeve is shifted by a first speed upon starting of the speed-change operation, and is shifted by a second speed smaller than the first speed when said sleeve is driven by the second drive force.

11. A shift control apparatus according to claim 2, wherein said control means controls said actuator so that said sleeve is shifted by a third speed faster than the second speed when said sleeve is driven by the third drive force.

12. A shift control apparatus according to claim 1, wherein said control means controls an operate pressure of said actuator so that a drive force of said sleeve is set in the max. force upon starting of a speed-change operation, in the min. force before said sleeve reaches to the balk point, in a first force larger than the min. force during a synchronize period after the balk point, in the max. force upon starting of a push-apart period, and in a second increased force larger than the first force before said sleeve reaches to a two-shift input point engaging with said free-rotated gear.

13. A shift control apparatus according to claim 1, further including a second actuator for selecting one of said sleeve to be shifted push-in, prior to the shift push-in operation.

14. A shift control apparatus according to claim 5, wherein said actuator includes a master cylinder, a proportional flow-amount cylinder communicated with the master cylinder, and a hydraulic cylinder communicated with the master cylinder and the proportional flow-amount cylinder and connected to said sleeve, all of which are controlled by said control means.

* * * * *